United States Patent
Vandellos et al.

(10) Patent No.: US 12,421,174 B2
(45) Date of Patent: Sep. 23, 2025

(54) PART MADE OF COMPOSITE MATERIAL, HAVING CONTROLLED CREEP

(71) Applicant: SAFRAN CERAMICS, Le Haillan (FR)

(72) Inventors: Thomas Vandellos, Moissy-Cramayel (FR); Simon Arnal, Moissy-Cramayel (FR); Eric Bouillon, Moissy-Cramayel (FR); Lallie Claudie Régine Quemeras, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 18/722,009

(22) PCT Filed: Dec. 19, 2022

(86) PCT No.: PCT/FR2022/052413
§ 371 (c)(1),
(2) Date: Jun. 20, 2024

(87) PCT Pub. No.: WO2023/118712
PCT Pub. Date: Jun. 29, 2023

(65) Prior Publication Data
US 2024/0417338 A1 Dec. 19, 2024

(30) Foreign Application Priority Data
Dec. 23, 2021 (FR) ...................... 2114311

(51) Int. Cl.
*C04B 41/52* (2006.01)
*C04B 41/00* (2006.01)
*C04B 41/50* (2006.01)

(52) U.S. Cl.
CPC ............ *C04B 41/52* (2013.01); *C04B 41/009* (2013.01); *C04B 41/5024* (2013.01)

(58) Field of Classification Search
CPC ...................................................... F01D 5/288
See application file for complete search history.

(56) References Cited

U.S. PATENT DOCUMENTS

| 2010/0129636 A1 | 5/2010 | Cybulsky et al. |
| 2014/0050930 A1 | 2/2014 | Das et al. |

(Continued)

FOREIGN PATENT DOCUMENTS

| CN | 101747028 A | 6/2010 |
| CN | 103588511 A | 2/2014 |

(Continued)

OTHER PUBLICATIONS

Written Opinion of the International Searching Authority as issued in International Patent Application No. PCT/FR2022/052413, dated Apr. 12, 2023.

(Continued)

*Primary Examiner* — Ian A Rummel
(74) *Attorney, Agent, or Firm* — Pillsbury Winthrop Shaw Pittman LLP

(57) ABSTRACT

A part made of coated composite material, includes a substrate made of ceramic matrix composite material; a tie-coat layer covering the substrate; and a protective coating on the tie-coat layer and defining an environmental barrier, the protective coating including a rare-earth silicate and including a first outer region including an outer surface of the protective coating opposite to the substrate and having a first working creep, having deformation of less than or equal to 0.07% when a compressive stress of at least 50 MPa is applied for a duration of 10 hours at a temperature of between 1050° C. and 1300° C. The first region includes a grain growth inhibitor; and a second, inner, environmental (Continued)

barrier region, including an interface of the protective coating with the tie-coat layer and having a second working creep.

8 Claims, 1 Drawing Sheet

(56) References Cited

U.S. PATENT DOCUMENTS

| | | |
|---|---|---|
| 2016/0312628 A1 | 10/2016 | Kirby |
| 2018/0022649 A1 | 1/2018 | Matsumoto et al. |
| 2019/0345074 A1 | 11/2019 | Pin et al. |
| 2021/0172331 A1 | 6/2021 | Le Biez et al. |

FOREIGN PATENT DOCUMENTS

| | | |
|---|---|---|
| CN | 105814007 A | 7/2016 |
| CN | 110198920 A | 9/2019 |
| CN | 109336647 B | 12/2020 |
| CN | 112601841 A | 4/2021 |

OTHER PUBLICATIONS

International Search Report as issued in International Patent Application No. PCT/FR2022/052413, dated Apr. 12, 2023.
Office Action as issued in Chinese Patent Application No. 202280089011.4, dated Jan. 4, 2025.

[Fig. 1]
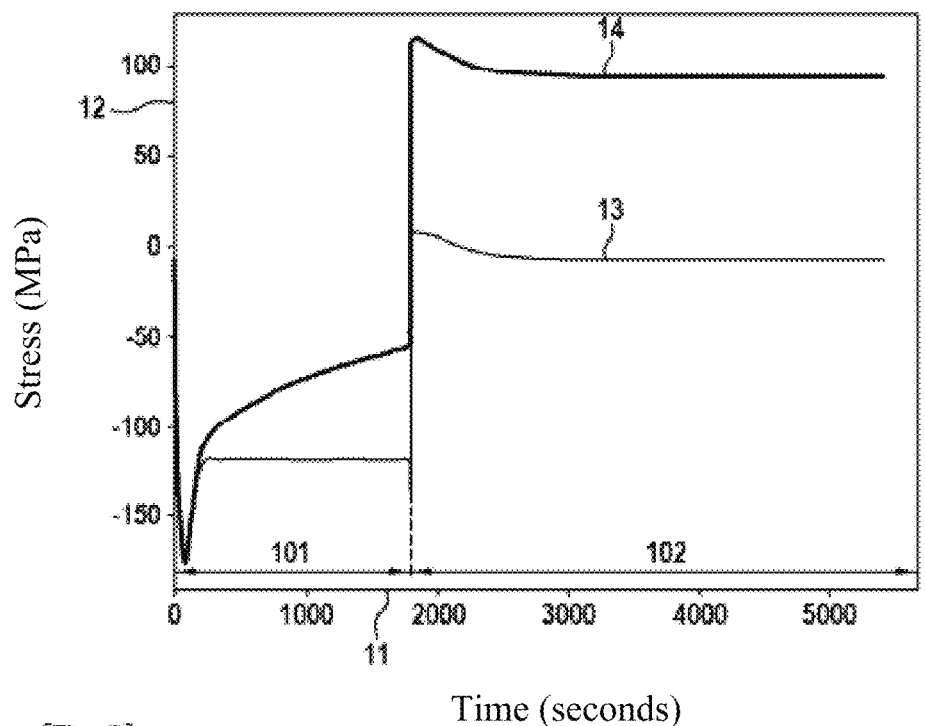
[Fig. 2]
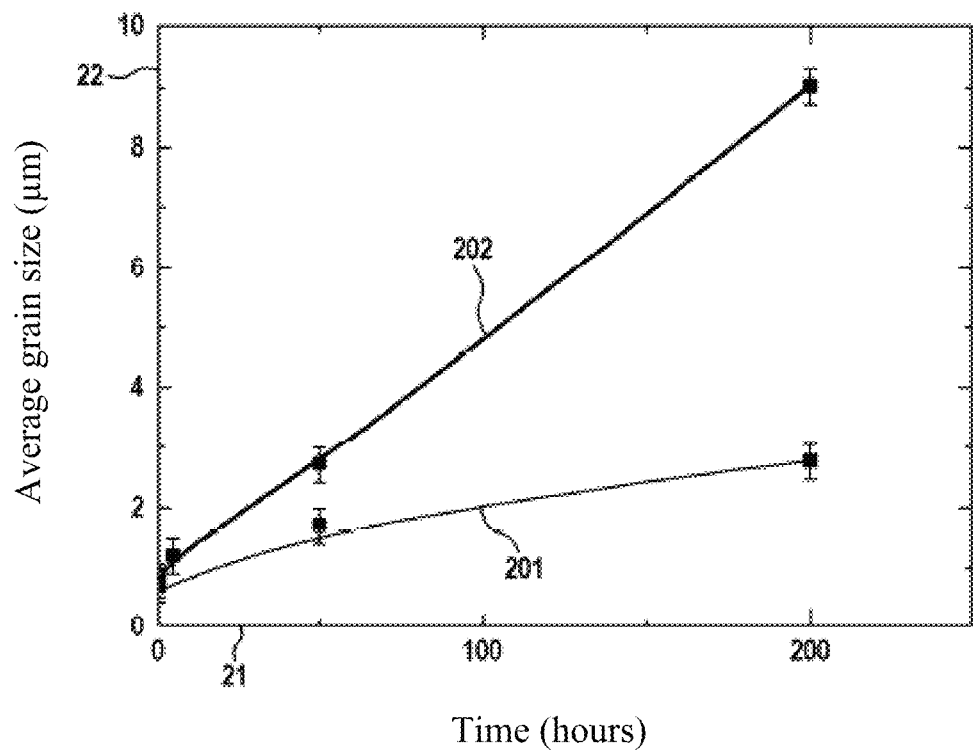

PART MADE OF COMPOSITE MATERIAL, HAVING CONTROLLED CREEP

CROSS-REFERENCE TO RELATED APPLICATIONS

This application is the U.S. National Stage of PCT/FR2022/052413, filed Dec. 19, 2022, which in turn claims priority to French patent application number 21 14311 filed Dec. 23, 2021. The content of these applications are incorporated herein by reference in their entireties.

TECHNICAL FIELD

The invention relates to the field of composite materials and more precisely to that of coatings applied to such materials to increase their service life under demanding conditions.

PRIOR ART

Composite materials provide a very good compromise between their weight and their mechanical properties, in addition to very good temperature resistance. These properties make them excellent candidates for replacing metal materials in certain aeronautical applications, and in particular for turbomachines.

However, these materials can deteriorate if they are placed in too aggressive an environment, such as the hot portion of an aeronautical turbomachine.

For this reason, they are generally coated with an environmental barrier and/or a thermal barrier, which enables them to support high temperatures or a oxidising environment. The substrate is generally coated with a tie-coat layer promoting the attachment of the environmental and/or thermal barrier on the composite material.

For example, in the case of a turbine part, the part can be coated with an environmental barrier, which is itself coated with an abradable layer.

The service life of composite material parts is linked to the damage mechanisms of the protective layers which can appear in operation.

It therefore remains desirable to improve the resistance of the coating layers of composite materials in order to provide an improved service life thereof.

DISCLOSURE OF THE INVENTION

The invention aims precisely to respond to the above-described need.

A solution is provided by proposing a coated composite material part comprising:
- a substrate made of ceramic matrix composite material;
- a tie-coat layer covering the substrate; and
- a protective coating that is present on the tie-coat layer and that defines at least one environmental barrier, the protective coating comprising at least one rare-earth silicate and comprising at least:
- a first outer region comprising an outer surface of the protective coating opposite to the substrate and having a first working creep, having deformation of less than or equal to 0.07% when a compressive stress of at least 50 MPa is applied for a duration of 10 hours at a temperature of between 1050° C. and 1300° C., said first region comprising at least one grain growth inhibitor in a sufficient quantity to obtain this first creep; and
- a second, inner, environmental barrier region, comprising at least one interface of the protective coating with the tie-coat layer and having a second working creep, having deformation of at least 0.01% when a compressive stress of at least 50 MPa is applied for a duration of 10 hours at a temperature of between 900° C. and 1000° C.

The inventors have arrived at the proposed solution in order to respond to the expressed need, by analysing in detail the damage modes of conventional coatings.

More specifically, two damage modes can appear in a coating of a composite material part.

The first damage mode is surface cracking, also referred to as crazing. Surface cracking is induced by a thermal gradient giving rise to stresses that are accommodated by creep. The creep of the coating is important in its outer portion which is subject to large temperature variations. This creep can lead to the appearance of cracks during cooling, which reduces the performance of the outer portion.

The second damage mode is cracking at depth located in the environmental barrier, between the tie-coat layer and the coating. This damage is due to oxidation of the tie-coat layer, which can lead to the growth of a layer generating local stresses. However, the inventors have also noticed that creep of the coating at the location where this second damage mode should appear, allows relaxation of these local stresses. Due to this creep, cracking at depth is not observed when the coating is placed under operating conditions.

Thus, the inventors have proposed adding a grain growth inhibitor, an agent which is known per se in the literature, in the first outer region in order to reduce the creep of this region. The conventional materials for environmental barriers, such as ytterbium disilicate ($Yb_2Si_2O_7$), exhibit the second creep described above. The addition of the grain growth inhibitor in the first region makes it possible to modify the values of creep with respect to a conventional coating, and enable the first creep of the first region to be obtained while retaining the second creep of the second region. The invention thus makes it possible to obtain a protective coating giving the coated part an improved service life, because it adapts the creep values so that it is specifically present where it is beneficial and is controlled where it is not desirable.

Through such a coating, surface cracking is largely reduced because the first creep makes it possible to avoid this cracking in the first region and cracking at depth remains unobserved, because the creep at the interface between the tie-coat layer and the coating is retained due to the second region having the second creep.

The second region is present between the first region and the tie-coat layer.

In an embodiment, the first region can have a thickness between 500 µm and 2000 µm.

This thickness presents an optimum in terms of cost and performance of a first region in the case where its function is to be an abradable region.

In an embodiment, the protective coating does not comprise any regions other than the tie-coat layer, the first region and the second region described above.

Nevertheless, it does not go beyond the scope of the invention if the protective coating further comprises an intermediate buffer region located between the first and second regions, this intermediate region having a composition distinct from those of the first and second regions.

If necessary, the intermediate region can serve as a buffer region for the possible diffusion of the grain growth inhibitor from the first region, enabling the risk that this agent diffuses to the second region to be reduced.

For example, the intermediate region can have a thickness less than or equal to 300 µm.

In another embodiment, such an intermediate region is not necessary, and the thickness of the second region is sufficient that the possible diffusion of the grain growth inhibitor does not affect the creep at the interface with the tie-coat layer.

In an embodiment, the thickness of the second region can be between 20 µm and 300 µm.

This thickness can ensure that the second creep of the second region allows excellent relaxation of the stresses during oxidation of the tie-coat layer, and it thus guarantees the absence of cracking at depth.

In addition, the thickness of the second region ensures a minimum distance between the first region and the tie-coat layer, so as to avoid any risk, even in the absence of an intermediate layer, that the grain growth inhibitors diffuse to the interface with the tie-coat layer during use. It is indeed important that the diffusion of the grain growth inhibitor remains low at this location. More specifically, too high a diffusion of the grain growth inhibitor to the second region could reduce the creep, and therefore reduce the performance of the coating.

In an embodiment, the grain growth inhibitor comprises at least one group IV to V transition metal oxide. For example, the grain growth inhibitor can comprise at least one from zirconium oxide ($ZrO_2$), titanium oxide ($TiO_2$) and hafnium oxide ($HfO_2$). In an embodiment, the grain growth inhibitor is zirconium oxide ($ZrO_2$).

In an embodiment, the content by mass of grain growth inhibitor in the first region is greater than or equal to 0.05%. For example, it can be between 0.05% and 10%

Such a content can ensure that the first region has a reduced creep due to the grain growth inhibitor, and can also ensure that the content of grain growth inhibitor is sufficiently low to avoid an excessive diffusion thereof to the second region for example, and also so as not to disturb the other desired properties for the first region.

As described above, a low quantity of the grain growth inhibitor in the second region, for example that obtained by diffusion during use of the coating, is not such as to radically change the creep behaviour of this second region. In particular, the second region retains a value consistent with the second creep.

In an embodiment, the first region comprises a rare earth silicate chosen from ytterbium disilicate ($Yb_2Si_2O_7$), yttrium disilicate ($Y_2Si_2O_7$) or a mixture of these two compounds (($Yb,Y)_2Si_2O_7$).

In an embodiment, the first region does not comprise any rare earth silicates other than those listed above.

In an embodiment, the second region comprises a rare earth silicate chosen from ytterbium disilicate ($Yb_2Si_2O_7$), yttrium disilicate ($Y_2Si_2O_7$) or a mixture of these two compounds (($Yb,Y)_2Si_2O_7$).

In an embodiment, the second region does not comprise any rare earth silicates other than those listed above.

If necessary, the intermediate region, that is present between the first and the second region, can comprise a rare earth silicate chosen from ytterbium disilicate ($Yb_2Si_2O_7$), yttrium disilicate ($Y_2Si_2O_7$) or a combination of these two compounds, for example a combination of at least one layer of ytterbium disilicate and at least one layer of yttrium disilicate.

In an embodiment, the intermediate region does not comprise any rare earth silicates other than those listed above.

In an embodiment, the tie-coat layer can comprise silicon (Si).

The tie-coat layer has the effect of promoting the adherence of the protective coating on the substrate.

In an embodiment, the first region and the second region can be of different types. For example, the coating can comprise at least a first layer defining the first outer region and comprising a first rare earth silicate, and a second layer defining the second inner region and comprising a second rare earth silicate different from the first rare earth silicate.

This embodiment makes it possible to choose compositions for each of the regions, which are particularly suitable for the functions that it is desired to obtain for the first and second region of the protective coating.

For example, the first layer is an abradable layer, and the second layer an environmental barrier. Independently or in combination, the first layer can be a thermal barrier and the second layer an environmental barrier.

The first layer can comprise yttrium disilicate ($Y_2Si_2O_7$) and at least one grain growth inhibitor, for example zirconium oxide ($ZrO_2$), and the second layer can comprise ytterbium disilicate ($Yb_2Si_2O_7$).

In this embodiment, the part can be a turbine ring sector, wherein the first region is abradable. According to an alternative, the part can be a turbomachine blade/vane with an abradable tip.

Whatever the nature of the first and second layers, a third layer can be added, defining the intermediate buffer region as described above, between the first and second layers.

BRIEF DESCRIPTION OF THE FIGURES

FIG. 1 schematically shows the change over time in the stress observed during one temperature cycle, with a thermal gradient applied on a coated ceramic matrix composite, at the hottest point on the surface of the coating for a first layer of a coating according to the invention and a first layer of a coating not according to the invention.

FIG. 2 shows the change over time in grain size, observed with and without growth inhibitor for a thermal cycle representative of the stabilisation treatment for a coating according to the invention and a coating not according to the invention.

DESCRIPTION OF THE EMBODIMENTS

The invention is now described by means of particular embodiments and figures, which are provided for illustrative purposes and should not be interpreted as limiting.

Within the meaning of the invention, a "rare earth silicate" should be understood as a compound comprising silicon Si, oxygen O and a rare earth denoted RE. it will be noted, in particular, that a rare earth RE monosilicate of general formula $RE_2SiO_5$, and a rare earth RE disilicate of general formula $RE_2Si_2O_7$, both fall within the definition retained for the invention of a rare earth silicate.

As described above, the coatings of the prior art are consistent with the second creep. If no special provision is made, known environmental or thermal barriers comprising one or more rare earth silicates are consistent with the second creep. For this reason, the presence of the grain growth inhibitor is important for enabling a region having the first creep to be obtained.

Within the meaning of the invention, creep has its usual definition in the art, namely the deformation that a material can undergo when subjected for a prolonged period to a stress or a stress gradient. Thus, the creep is expressed as a deformation given as a function of the stress, the time and the applied temperature.

In general, the first region with the first creep comprises a first rare earth silicate and the grain growth inhibitor, and the second region with a second creep comprises a second rare earth silicate that is identical to or different from the first rare earth silicate.

Reference is now made to FIGS. 1 and 2.

These figures show the differences in behaviour between a coating according to the invention and a coating not according to invention. The measurements presented in these figures are obtained from a protective coating according to the invention and a protective coating of the prior art, for which the compositions are similar to the presence of the grain growth inhibitor in the outer layer.

For the measurements of FIGS. 1 and 2, the coated part according to the invention comprises the following layers:
- a substrate made of ceramic matrix composite material;
- a tie-coat layer of silicon (Si);
- a layer defining the environmental barrier comprising ytterbium disilicate ($Yb_2Si_2O_7$); and
- an abradable layer defining the first region and comprising yttrium disilicate ($Y_2Si_2O_7$) and a content by mass of 1% zirconium oxide ($ZrO_2$) as grain growth inhibitor.

The coated part not according to the invention comprises the same layers defining the same regions, but no grain growth inhibitor in its first abradable layer.

In the embodiment of these examples, it will be noted that the first (and respectively second) layer defines the first (and respectively second) region. It is recalled that this is just a descriptive embodiment and that it does not exclude the case where the layers do not exactly define the regions.

FIG. 1 illustrates the change over time in the stress observed during one temperature cycle, with a thermal gradient applied to a coated ceramic matrix composite material, at the hottest point on the surface of the coating for a first layer of a coating according to the invention and a first layer of a coating not according to the invention.

FIG. 1 shows the change over time in the stress 12 in the layer, expressed in MPa, as a function of time 11 expressed in seconds.

The change over time in the stress in each of the first layers is evaluated during a heating and then cooling cycle. The heating is not homogeneous and creates a thermal gradient in the coating. During the period 101, the coating is heated to 1300° C., then the coating is left in the air to cool for the period 102.

The curves 13, 14 in FIG. 1 show that a part with a first layer according to the invention 13 or not according to the invention 14 have, during the heating 101, compression stresses, the stresses being negative.

It is however remarkable that during the cooling 102, a first layer according to the invention 13 has no large tensile stress. On the other hand, a first layer not according to the invention 14 has a large tensile stress.

It would appear on looking at FIG. 1 that a first layer according to the invention 13 can avoid an excessive tensile stresses, thus avoiding surface cracking of a coating.

More specifically, in the coating not according to the invention 14, the creep can accommodate the compression stresses created during heating, which is seen in curve 14 by the reduction in absolute value of the compressive stress appearing during heating 101. The first layer not according to the invention is then under tension during cooling 102, but can no longer accommodate this tensile stress by creep, because the temperature is then too low and, as a consequence, a crazing of the layer not according to the invention is observed.

By contrast, a layer according to the invention 13 does not creep during heating 101, and it can be seen in FIG. 1 that effectively the stress is not reduced. Since the layer according to the invention has not undergone creep, cooling 102 enables it to return to a state of stress close to the initial state without passing through an excessively high tensile stress state.

FIG. 2 shows the change over time in the average size of the grains 22, expressed in μm, in the first layers of the two parts, one according to the invention, the other not according to the invention, during sintering at 1400° C., the duration of which 21 is expressed in hours This treatment is representative of the stabilisation treatment applied in order to form the first layer.

FIG. 2 shows the change over time in the observed grain size, for a coating according to the invention and a coating not according to the invention, during a thermal cycle representative of a stabilisation treatment of the coating. It illustrates that the presence of the grain growth inhibitor in a first layer of a coating according to the invention, curve 201, can prevent the growth in size of the grains, which then limits the creep in a first region according to the invention. On the other hand, in a first region of a coating not according to the invention, curve 202, the grain size changes linearly with the duration of the stabilisation treatment, which is associated with significant creep.

In an embodiment, the inhibitor is present in the form of precipitates, located at the grain boundaries, and the average size of which can be between 100 nm and 1 μm.

In a particular embodiment, the first region can comprise yttrium disilicate ($Y_2Si_2O_7$) and zirconium oxide ($ZrO_2$) as grain growth inhibitor. For example, the content by mass of yttrium disilicate ($Y_2Si_2O_7$) is greater than or equal to 90%, for example between 90% and 99.95%, and the content by mass of zirconium oxide ($ZrO_2$) is between 0.05% and 10%.

In another particular embodiment, the first region can comprise yttrium disilicate ($Y_2Si_2O_7$) and hafnium oxide ($HfO_2$) as grain growth inhibitor. For example, the content by mass of yttrium disilicate ($Y_2Si_2O_7$) is greater than or equal to 90%, for example between 90% and 99.95%, and the content by mass of hafnium oxide ($HfO_2$) is between 0.05% and 10%.

In another particular embodiment, the first region can comprise yttrium disilicate ($Y_2Si_2O_7$) and titanium oxide ($TiO_2$) as grain growth inhibitor. For example, the content by mass of yttrium disilicate ($Y_2Si_2O_7$) is greater than or equal to 90%, for example between 90% and 99.95%, and the content by mass of titanium oxide ($TiO_2$) is between 0.05% and 10%.

In an embodiment, the second region can comprise ytterbium disilicate ($Yb_2Si_2O_7$), for example in a content by mass of ytterbium disilicate ($Yb_2Si_2O_7$) greater than or equal to 90%.

For example, a protective coating as has just been described can be obtained by a method known per se of thermal spraying of a powder mixture and sintering. In the embodiment described, it is again provided that a single layer of the coating defines a region.

In an embodiment, the composition of the powder used in a thermal spraying method of powder in order to create the second region can be an ytterbium disilicate ($Yb_2Si_2O_7$) powder. In an alternative embodiment, the thermally sprayed powder can comprise an ytterbium (Yb) powder and a silica ($SiO_2$) powder, in proportions which will make it possible to obtain ytterbium disilicate ($Yb_2Si_2O_7$) after sintering.

In an embodiment, the composition of the powder used in a powder thermal spraying method in order to create the first region can be an yttrium disilicate ($Y_2Si_2O_7$) powder and a grain growth inhibitor powder, for example a zirconium oxide ($ZrO_2$) powder. In an alternative embodiment, the thermally sprayed powder can comprise a silica ($SiO_2$) powder and an yttrium (Y) powder, in proportions making it possible to obtain, after sintering, a layer of yttrium disilicate ($Y_2Si_2O_7$), and a grain growth inhibitor powder, for example a zirconium oxide ($ZrO_2$) powder.

Of course, the grain growth inhibitor powder is chosen such that the quantity of grain growth inhibitor obtained is suitable for producing the desired creep limitation.

Once the one or more powders are deposited on the surface of the composite material part, the coating can be obtained by sintering.

Alternatively, the protective coating can be obtained by depositing powders in the form of slurries and sintering. The protective coating can again be obtained by plasma torch or by liquid method, for example by electrophoresis or by dip coating. The coating can also be obtained by chemical vapour deposition.

The invention claimed is:

1. A part made of coated composite material comprising:
a substrate made of ceramic matrix composite material;
a tie-coat layer covering the substrate; and
a protective coating that is on the tie-coat layer and that defines at least one environmental barrier, the protective coating comprising at least one rare-earth silicate, which is selected from the group consisting of ytterbium disilicate ($Yb_2Si_2O_7$), yttrium disilicate ($Y_2Si_2O_7$) and any combination thereof, and comprising at least:
a first outer region comprising an outer surface of the protective coating opposite to the substrate and having a first working creep, having deformation of less than or equal to 0.07% when a compressive stress of at least 50 MPa is applied for a duration of 10 hours at a temperature of between 1050° C. and 1300° C., said first region comprising at least one grain growth inhibitor in a sufficient quantity to obtain this first creep; and
a second, inner, environmental barrier region, comprising at least one interface of the protective coating with the tie-coat layer and having a second working creep, having deformation of at least 0.01% when a compressive stress of at least 50 MPa is applied for a duration of 10 hours at a temperature of between 900° C. and 1000° C.,
wherein the grain growth inhibitor is selected from the group consisting of zirconium oxide ($ZrO_2$), titanium oxide ($TiO_2$) and hafnium oxide ($HfO_2$) and any combination thereof, and wherein the content by mass of grain growth inhibitor in the first region is between 0.05% and 10%.

2. The part according to claim 1, wherein a thickness of the second region can be between 20 μm and 300 μm.

3. The part according to claim 1, wherein the tie-coat layer comprises silicon (Si).

4. The part according to claim 1, wherein the protective coating comprises at least a first layer defining the first outer region and comprising a first rare earth silicate, and a second layer defining the second, inner, region and comprising a second rare earth silicate different from the first rare earth silicate.

5. The part according to claim 4, wherein the first layer is an abradable layer and the second layer an environmental barrier.

6. The part according to claim 5, wherein the first layer comprises an yttrium disilicate ($Y_2Si_2O_7$) and said at least one grain growth inhibitor, and the second layer comprises an ytterbium disilicate ($Yb_2Si_2O_7$).

7. The part according to claim 1, wherein the protective coating further comprises an intermediate buffer region present between the first and second regions, this intermediate region having a composition distinct from those of the first and second regions.

8. The part according to claim 1, wherein said part is a turbine ring sector and wherein the first region is abradable.

* * * * *